US011998955B2

(12) United States Patent
Sakai et al.

(10) Patent No.: US 11,998,955 B2
(45) Date of Patent: Jun. 4, 2024

(54) ETCHING DEVICE FOR SILICON CORE WIRE AND ETCHING METHOD FOR SILICON CORE WIRE

(71) Applicant: TOKUYAMA CORPORATION, Yamaguchi (JP)

(72) Inventors: Junya Sakai, Yamaguchi (JP); Takuya Yokose, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 244 days.

(21) Appl. No.: 17/766,651

(22) PCT Filed: Sep. 4, 2020

(86) PCT No.: PCT/JP2020/033525
§ 371 (c)(1),
(2) Date: Apr. 5, 2022

(87) PCT Pub. No.: WO2021/090565
PCT Pub. Date: May 14, 2021

(65) Prior Publication Data
US 2023/0124413 A1 Apr. 20, 2023

(30) Foreign Application Priority Data
Nov. 5, 2019 (JP) .................................. 2019-200799

(51) Int. Cl.
*B08B 3/04* (2006.01)
*B08B 13/00* (2006.01)
(Continued)

(52) U.S. Cl.
CPC ................ *B08B 3/04* (2013.01); *B08B 13/00* (2013.01); *C01B 33/02* (2013.01); *C01B 33/021* (2013.01); *C01B 33/037* (2013.01)

(58) Field of Classification Search
None
See application file for complete search history.

(56) References Cited

FOREIGN PATENT DOCUMENTS

CN 109365385 * 2/2019 ............... B08B 3/08
JP 63-285938 11/1988
(Continued)

OTHER PUBLICATIONS

Written Opinion for PCT/JP2020/033525 and its English translation (International Preliminary Report on Patentability); dated Nov. 10, 2020; 4 pages.
(Continued)

*Primary Examiner* — Jiong-Ping Lu
(74) *Attorney, Agent, or Firm* — Casimir Jones, S.C.; Robert A. Goetz

(57) ABSTRACT

A device is provided which is capable of evenly etching the entire surface of a silicon core wire. An etching device (1) for a silicon core wire (C1, C2, C3) includes: an etching bath (11, 12) for holding an etching solution (L1, L2); and a plurality of core wire support members (31) for supporting the silicon core wire (C1, C2, C3), the plurality of core wire support members (31) each having a hole (31A) through which the silicon core wire (C1, C2, C3) is to pass; and a position change mechanism (40) for changing a relative position where the silicon core wire (C1, C2, C3) passes through in relation to the hole (31A).

8 Claims, 10 Drawing Sheets

(51) Int. Cl.
    *C01B 33/02*    (2006.01)
    *C01B 33/021*   (2006.01)
    *C01B 33/037*   (2006.01)

(56)            References Cited

FOREIGN PATENT DOCUMENTS

JP          4-26124         1/1992
JP          7-270631  A    10/1995
JP       2000-128692        5/2000
JP       2004-335669       11/2004
JP       2005-288333       10/2005
JP       2012-106914        6/2012
JP       2012-211073       11/2012
JP       2012-224499       11/2012
JP        2015-24958        2/2015
WO    WO 2012/144161  A1   10/2012

OTHER PUBLICATIONS

International Search Report for PCT/JP2020/033525 and its English translation; dated Nov. 10, 2020; 2 pages.
Office Action for CN Patent Application No. 202080071162.8, dated Sep. 26, 2023, 9 pages.

* cited by examiner

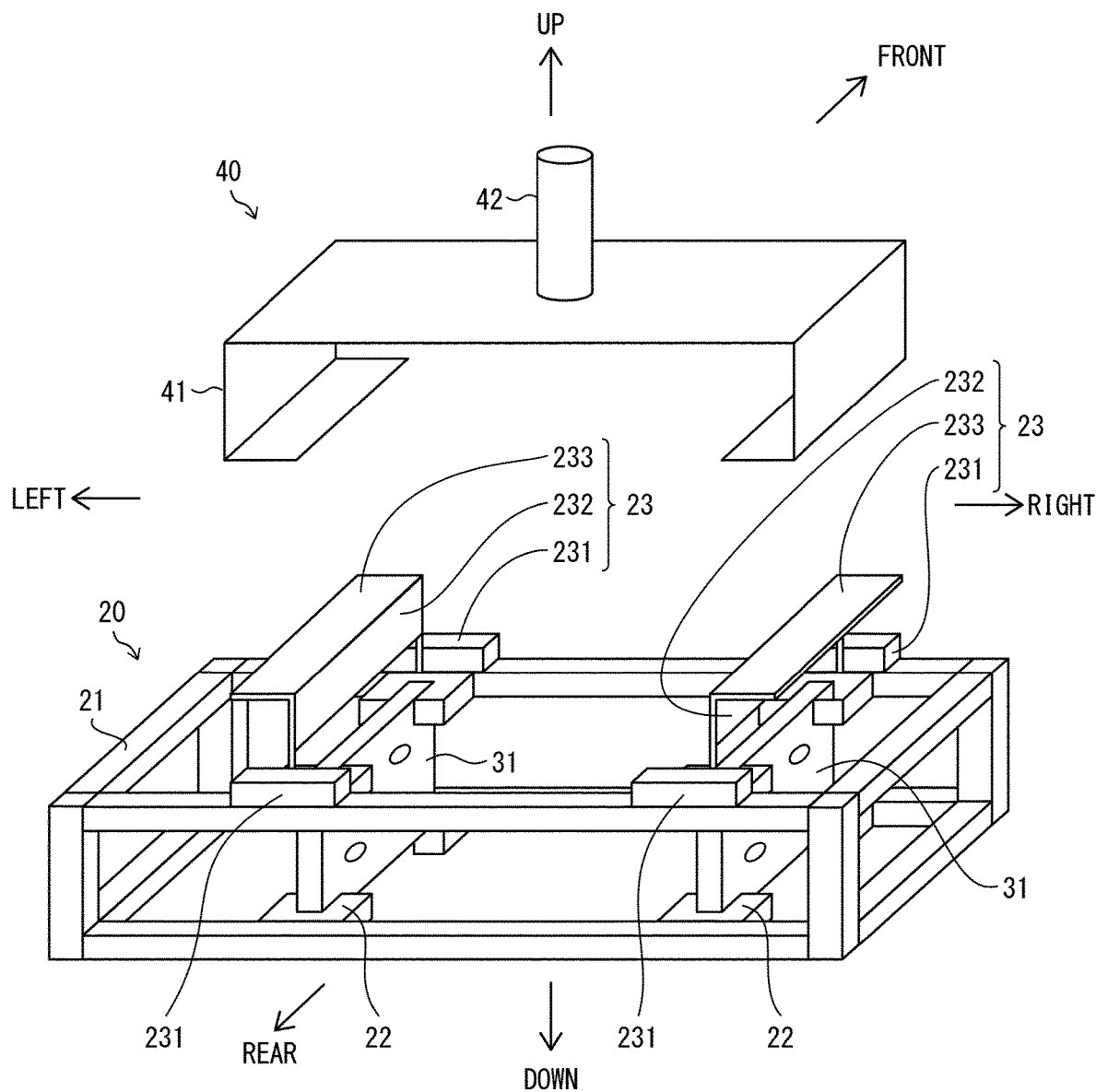

ETCHING DEVICE FOR SILICON CORE WIRE AND ETCHING METHOD FOR SILICON CORE WIRE

TECHNICAL FIELD

The present invention relates to an etching device for a silicon core wire and an etching method for a silicon core wire.

BACKGROUND ART

Polycrystalline silicon to be used as a semiconductor material or the like needs to be of extremely high purity. Patent Literature 1 discloses a cleaning method for cleaning rod-shaped polycrystalline silicon while the polycrystalline silicon is directly hung on a hanger.

CITATION LIST

Patent Literature

[Patent Literature 1]
Japanese Patent Application Publication Tokukai No. 2005-288333

SUMMARY OF INVENTION

Technical Problem

When the above-described conventional technique is applied to a silicon core wire to be used for the deposition of polycrystalline silicon, it may be difficult to evenly etch the entire surface of the silicon core wire. Further, a silicon core wire, which is lighter than a rod-shaped polycrystalline silicon, could fall off the hanger.

In particular, a hanger disclosed by way of example in Patent Literature 1 is an L-shaped hanger. While a silicon core wire to be etched is supported by such a hanger, the space above the silicon core wire is widely open. This makes the silicon core wire likely to fall. One possible solution to this problem of fall is an increase in the number of hangers. However, the increase in the number of hangers leads to an increase in the number of points of contact between the hangers and a silicon core wire to be etched. This makes even etching difficult.

The object of an aspect of the present invention is to provide a device capable of evenly etching the entire surface of a silicon core wire.

Solution to Problem

In order to solve the above-described problems, a silicon core wire etching device in accordance with an aspect of the present invention includes: an etching bath for holding an etching solution in which a silicon core wire is to be immersed; a plurality of core wire support members for supporting the silicon core wire, the plurality of core wire support members each having at least one hole, the at least one hole including a hole through which the silicon core wire is to pass; and a position change mechanism for changing, while the silicon core wire is passed through the plurality of core wire support members and immersed in the etching solution, a relative position where the silicon core wire passes through in relation to the hole.

A silicon core wire etching method in accordance with an aspect of the present invention includes: a pass-through step of passing a silicon core wire through a hole formed in each of a plurality of core wire support members for supporting the silicon core wire; a first immersing step of immersing the silicon core wire supported by the plurality of core wire support members in an etching solution; and a first position change step of changing a relative position where the silicon core wire passes through in relation to the hole.

Advantageous Effects of Invention

An aspect of the present invention makes it possible to provide a device capable of evenly etching the entire surface of a silicon core wire.

BRIEF DESCRIPTION OF DRAWINGS

FIG. 10 is a view illustrating a state in which a mounting cassette has not yet been attached to a crane in an etching device in accordance with Embodiment 3 of the present invention.

DESCRIPTION OF EMBODIMENTS

Embodiment 1

The following description will discuss in detail an embodiment of the present invention with reference to the drawings.

<Silicon Core Wire Etching Device>

Figure 1:
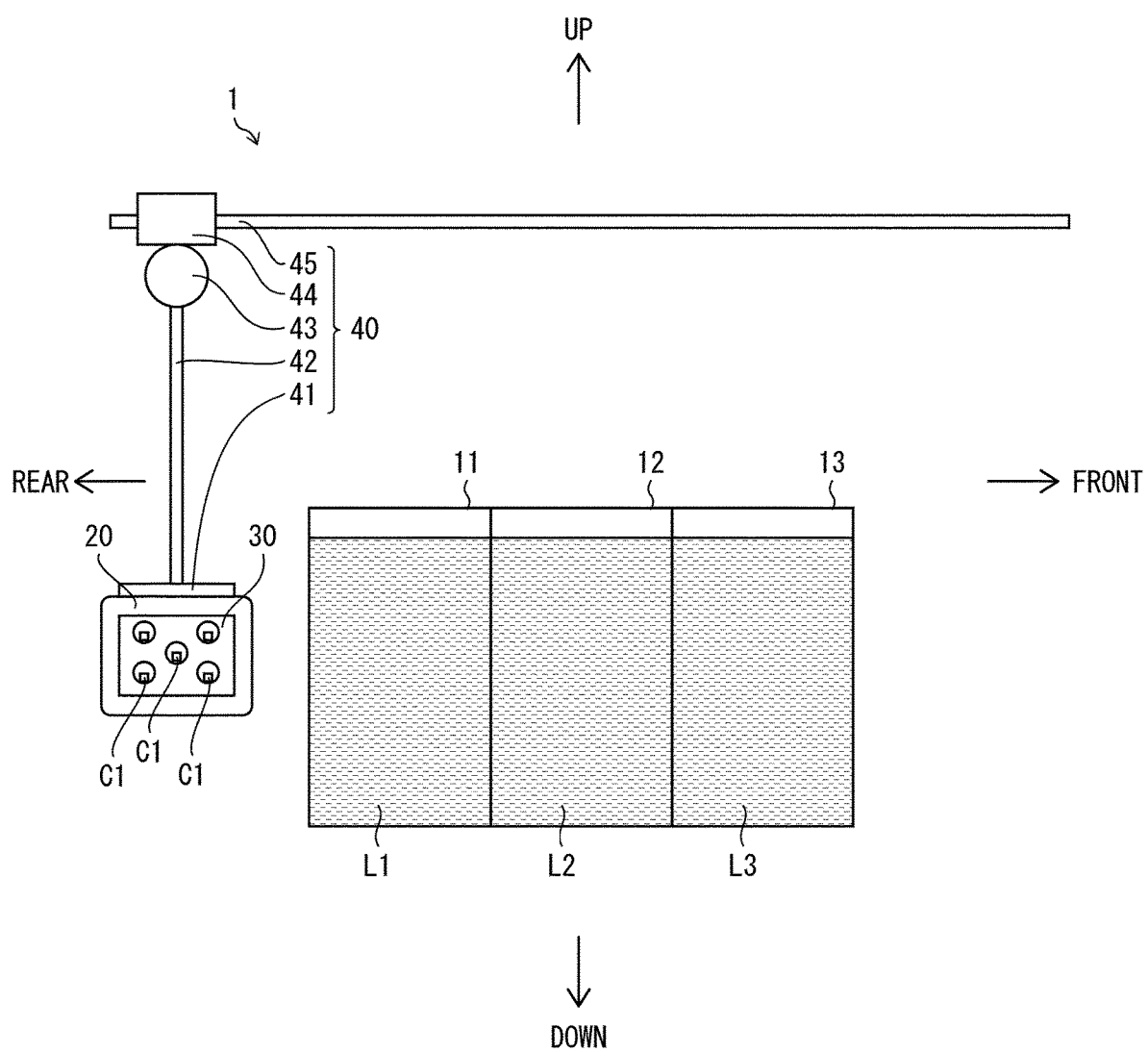
FIG. 1 is a view schematically illustrating an initial state of a silicon core wire etching device in accordance with Embodiment 1 of the present invention.

As illustrated in FIG. 1, an etching device 1 for silicon core wires C1 includes: a first etching bath 11; a second etching bath 12; a cleaning bath 13; a mounting cassette 20; a core wire holder 30; and a crane (position change mechanism) 40.

In this specification, a front side, a rear side, an upper side, and a lower side are defined as follows on the basis of the initial state of the etching device 1 illustrated in FIG. 1: a position of the first etching bath 11 relative to the core wire holder 30 is referred to as the front side; a position of the core wire holder 30 relative to the first etching bath 11 is referred to as the rear side; a position of a lifting and lowering mechanism 43 of the crane 40 relative to the core wire holder 30 is referred to as the upper side; and a position of the core wire holder 30 relative to the lifting and lowering mechanism 43 is referred to as the lower side.

Figure 2:
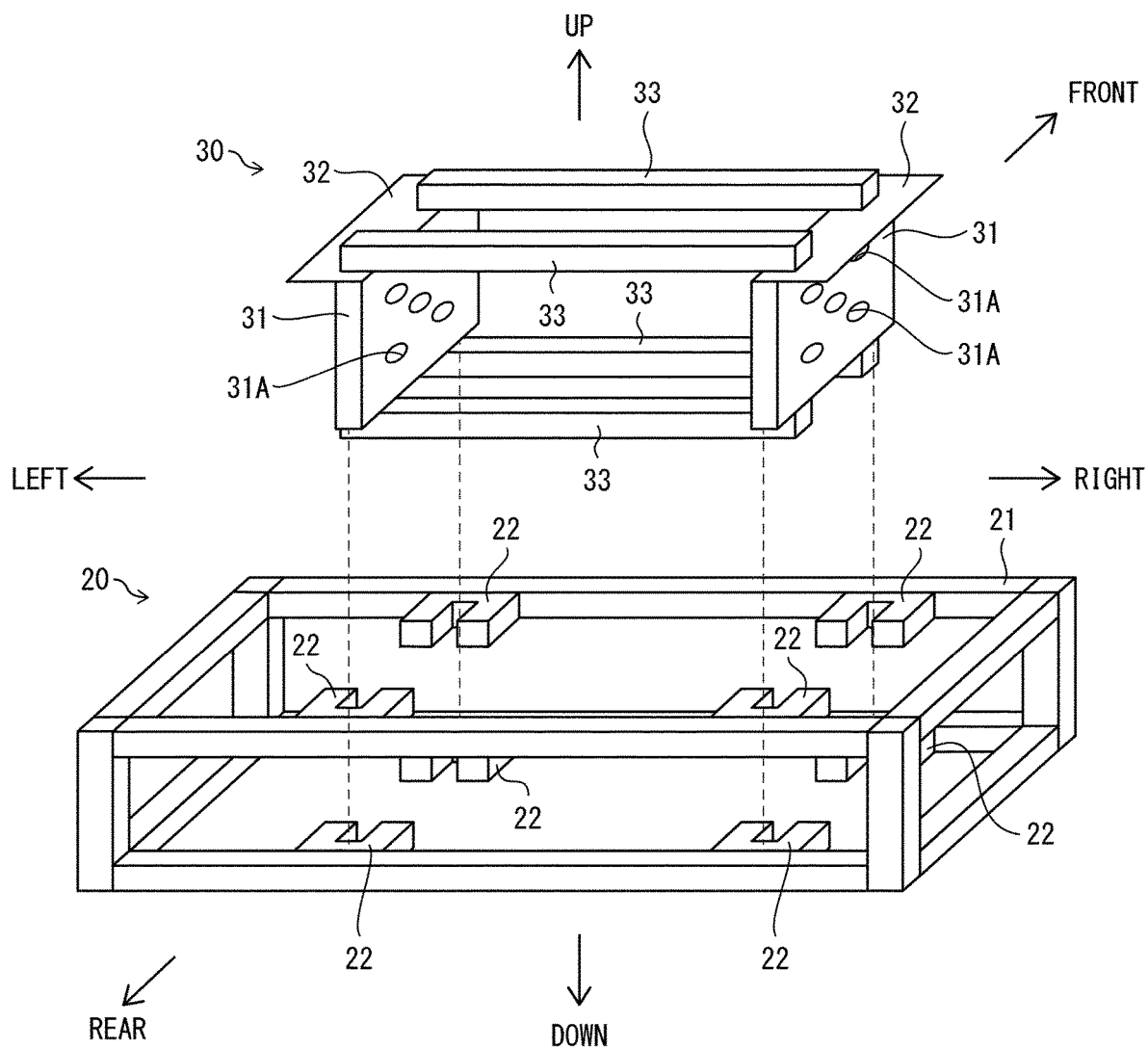
FIG. 2 is an exploded view schematically illustrating a mounting cassette and a core wire holder of the etching device of FIG. 1.
Figure 3:
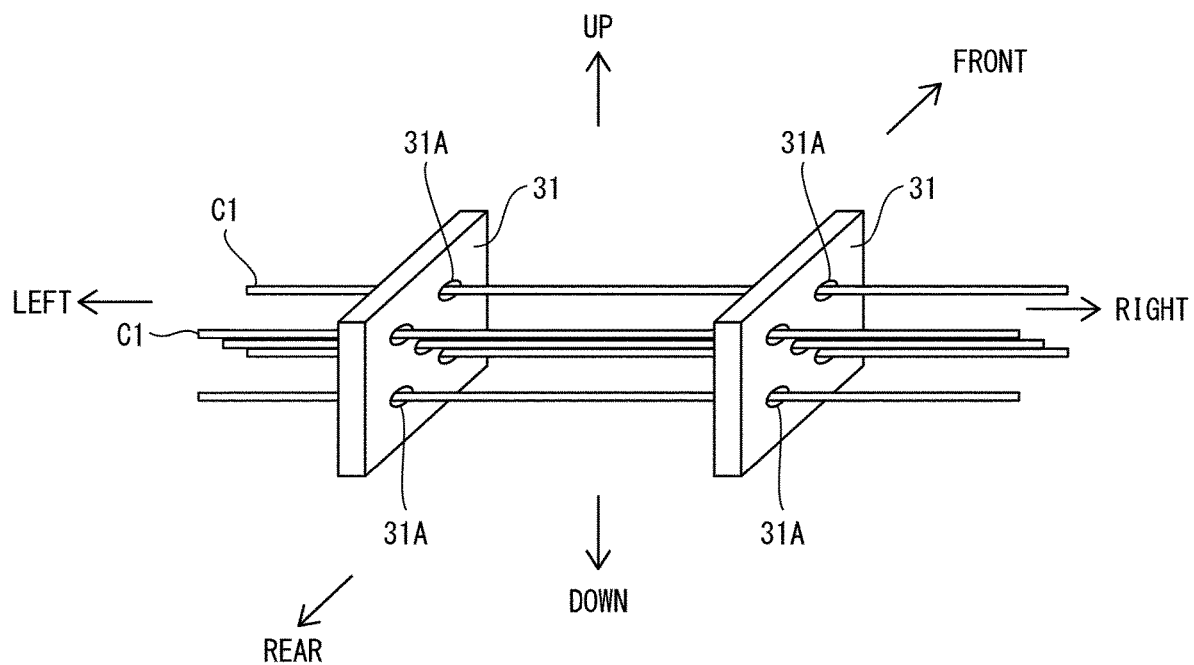
FIG. 3 is a view illustrating a state in which core wire support boards support silicon core wires in the etching device of FIG. 1.

As illustrated in FIGS. 2 and 3, the silicon core wires C1 pass through through holes 31A of core wire support boards (core wire support members) 31 of the core wire holder 30, and are supported by the core wire support boards 31. In this specification, as illustrated in FIG. 2 and other figures, a position on the right-hand side and a position on the left-hand side as seen from the rear side are referred to as a right side and a left side, respectively. Since the silicon core wires C1 supported by the core wire support boards 31 extend in a right-and-left direction, the silicon core wires C1 extend perpendicularly to the drawing sheet of FIG. 1.

The silicon core wires C1 are used to deposit polycrystalline silicon on the surfaces of the silicon core wires C1 when polycrystalline silicon is produced by, for example, the Siemens process. The silicon core wires C1 are produced by, for example, but not limited to, cutting out from rod-shaped polycrystalline silicon or monocrystalline silicon.

The silicon core wires C1 thus produced have the shape of, for example, a cylinder, an elliptic cylinder, a prism whose two ends are substantially rectangular, or a prism whose two ends are polygonal. The silicon core wires C1 having the shape of a prism can be easily produced by linearly cutting large, rod-shaped polycrystalline silicon into pieces. For example, the silicon core wires C1 have a cross-sectional area of not less than 0.1 cm$^2$ and not more than 6 cm$^2$ and a length of not less than 200 mm. The upper limit of the length of the silicon core wires C1 is not limited to any particular length but is typically approximately 2000 mm, and preferably approximately 1500 mm.

The first etching bath 11 and the second etching bath 12 hold a first etching solution L1 and a second etching solution L2, respectively. The first etching solutions L1 and the second etching solution L2 are used to etch the surfaces of the silicon core wires C1. The second etching bath 12 and the cleaning bath 13 are arranged in sequence on the front side of the first etching bath 11. In the present embodiment, the silicon core wires C1 are immersed and etched in the first etching solution L1 in the first etching bath 11, and then immersed and etched in the second etching solution L2 in the second etching bath 12, as discussed later.

Examples of the first etching solution L1 and the second etching solution L2 can include, but not limited to, an aqueous solution of hydrogen fluoride (HF) (also referred to as hydrofluoric acid), an aqueous solution of nitric acid (HNO$_3$), and a mixture thereof. From the viewpoint of improving the surface flatness of the silicon core wires C1 having been etched, a mass ratio of HF to HNO$_3$ is preferably higher in the second etching solution L2 than in the first etching solution L1. For example, the HF:HNO$_3$ mass ratio of the first etching solution L1 is preferably 1:50 to 1:30, and the HF:HNO$_3$ mass ratio of the second etching solution L2 is preferably 1:30 to 1:5.

The first etching solution L1 and the second etching solution L2 may contain HNO$_3$ at a concentration appropriately determined according to the contamination condition of the silicon core wires C1 to be etched and the target degree of cleanliness of the silicon core wires C1 having been etched. For example, the first etching solution L1 preferably contains HNO$_3$ at a concentration of more than 64 mass % and not more than 69 mass %. The second etching solution L2 preferably contains HNO$_3$ at a concentration of not less than 60 mass % and not more than 67 mass %. The concentration of HNO$_3$ is preferably, but not limited to, a concentration higher in the first etching solution L1 than in the second etching solution L2.

In the present embodiment, two baths that are the first etching bath 11 and the second etching bath 12 are provided as etching baths. However, the number of etching baths is not limited to this, and a single etching bath may be provided, or not less than three etching baths may be provided. Even in a case where the number of etching baths is one, the present invention, of course, produces its effect sufficiently.

In a case where not less than three etching baths are provided, an etching solution held in an etching bath at a more downstream step preferably has a higher mass ratio of HF to HNO$_3$, from a viewpoint of improving the surface flatness of the silicon core wires C1 having been etched. This enables the control of an unnecessary temperature increase of the etching solutions. Such a temperature increase is due to rapid progress of etching caused when the silicon core wires C1 are etched by using an etching solution containing HF in a high mass ratio from the very beginning. Note that, in this case, the third etching solution preferably contains HNO$_3$ at a concentration of not less than 55 mass % and not more than 64 mass %. In addition, the concentration of HNO$_3$ is preferably higher in the second etching solution L2 than in the third etching solution.

At least respective surfaces of the first etching bath 11 and the second etching bath 12 are preferably made of a material resistant to corrosion by the first etching solution L1 and the second etching solution L2. Further, the surfaces of the first etching bath 11 and the second etching bath 12 are preferably made of a material that does not generate a substance which causes contamination of the silicon core wires C1.

The cleaning bath 13 holds cleaning water L3 in which the silicon core wires C1 is to be immersed. Examples of the cleaning water L3 preferably include high purity water. From the viewpoint of preventing contamination of the silicon core wires C1 with an impurity, the cleaning water L3 is preferably pure water having an electrical resistivity of not less than 1 MΩcm (megaohm-centimeter). A plurality of cleaning baths 13 may be provided, and the silicon core wires C1 supported by the core wire holder 30 may be immersed, in sequence, in cleaning water held in the respective cleaning baths. In this case, the cleaning water held in the cleaning bath disposed last in the sequence preferably has the highest purity.

As illustrated in FIG. 2, the mounting cassette 20 includes: a frame 21; and eight insertion sections 22. The number of the insertion sections 22 is not limited to eight but can be appropriately changed according to, for example, etching efficiency and the size of the etching device 1. The frame 21 includes rod-shaped sections that are formed so as to correspond to the respective edges of a shape which substantially is a rectangular parallelepiped. Each of the edges extends in up-and-down, front-and-rear, or right-and-left directions.

The rod-shaped sections included in the frame 21 that extend in the right-and-left direction are provided with eight insertion sections 22. Each of the eight insertion sections 22 has the shape of a pair of protrusions facing each other in the right-and-left direction. The mounting cassette 20 is designed such that the core wire holder 30 is mounted in the mounting cassette 20 by inserting the core wire support boards 31 (described later) of the core wire holder 30 between the pairs of protrusions of the insertion sections 22.

The mounting cassette 20 further includes a fixing member (not illustrated) for fixing the core wire holders 30 to the mounting cassette 20.

The core wire holder 30 includes: two core wire support boards 31; hooks 32; and connecting sections 33. The core wire support boards 31 are disposed so as to extend in the up-and-down and front-and-rear directions. The core wire support boards 31 have a plurality of through holes (holes) 31A through which the silicon core wires C1 pass.

It should be noted that the mounting cassette 20 is not essential to the etching device in accordance with the present invention provided that it is possible to change, while the silicon core wires C1 are passed through the plurality of core wire support boards 31, respective relative positions where the silicon core wires C1 pass through in relation to the through holes 31A. In the present embodiment, the core wire holder 30 includes the hooks 32. This makes it possible to achieve the present invention by attaching the hooks 32 to the crane 40 so that the crane 40 reciprocates the core wire holder 30 in the up-and-down direction.

As illustrated in FIG. 3, the core wire support boards 31 are designed so as to support the silicon core wires C1 while the silicon core wires C1 are passed through the through holes 31A. Since the silicon core wires C1 can pass through the respective through holes 31A formed in the core wire support boards 31, the core wire support boards 31 are designed so as to be capable of supporting the plurality of silicon core wires C1.

Each of the through holes 31A in the core wire support boards 31 is formed by a periphery shaped into a continuous, curved line. Further, the peripheries of the through holes 31A in the core wire support boards 31 preferably have a rounded, smooth shape. For example, the peripheries of the through holes 31A in the core wire support boards 31 may have a circular shape and an oval shape. Alternatively, the peripheries of the through holes 31A may have the shape of a polygon including, for example, a square, a rectangle, and other quadrangles, and a hexagon.

In a case where the silicon core wires C1 to be etched are prismatic, shaping the peripheries of the through holes 31A in the core wire support boards 31 into a circle or an oval enables a reduction in the area of contact between the silicon core wires C1 and the core wire support boards 31. In this case, when the core wire holder 30 is reciprocated in the up-and-down direction, the silicon core wires C1 are easily separated from the core wire support boards 31. This makes it easy to change the relative positions through which the silicon core wires pass and perform even etching.

The peripheries of the through holes 31A in the core wire support boards 31 may be continuous and have a shape with projections and depressions so that the area of contact with the silicon core wires C1 is reduced. In this case, the silicon core wires C1 abut on tips of the projections of the peripheries. This makes the silicon core wires C1 less likely to abut on the depressions of the peripheries and therefore makes it easy to reduce the area of contact between the peripheries and the silicon core wires C1.

In a case where the through holes 31A have a circular shape, the through holes 31A have a diameter which is preferably not less than 1.1 times and more preferably not less than 1.2 times the diameter of a minimum enclosing circle for the cross section of the silicon core wires C1. Further, the diameter of the through holes 31A is not limited to any particular length but is preferably not more than 2.0 times the diameter of the minimum enclosing circle for the cross section of the silicon core wires C1. In this case, the silicon core wires C1 are less likely to drop off the core wire support boards 31 during a change of the respective relative positions where the silicon core wires C1 pass through in relation to the through holes 31A.

In a case where the through holes 31A have a shape other than a circular shape, the through holes 31A have a shorter diameter that is preferably not less than 1.1 times and more preferably not less than 1.2 times the diameter of the minimum enclosing circle for the cross section of the silicon core wires C1. In this case, also from the viewpoint of preventing the silicon core wires C1 from dropping off the core wire support boards 31, the shorter diameter of the through holes 31A is preferably not more than 2.0 times the diameter of the minimum enclosing circle for the cross section of the silicon core wires C1.

The peripheries of the through holes 31A in the core wire support boards 31 may have an open part that is shorter in length than the diameter of the minimum enclosing circle for the cross section of the silicon core wires. However, the peripheries of the through holes 31A in the core wire support boards 31 preferably have a continuous shape, in order to prevent the silicon core wires C1 from dropping off the core wire support boards 31 during etching and/or during cleaning. In a case where the peripheries of the through holes 31A in the core wire support boards 31 have a continuous shape, it is possible to easily provide the core wire support boards 31 with many through holes, and therefore possible to easily etch many silicon core wires C1 at a time.

Figure 4:
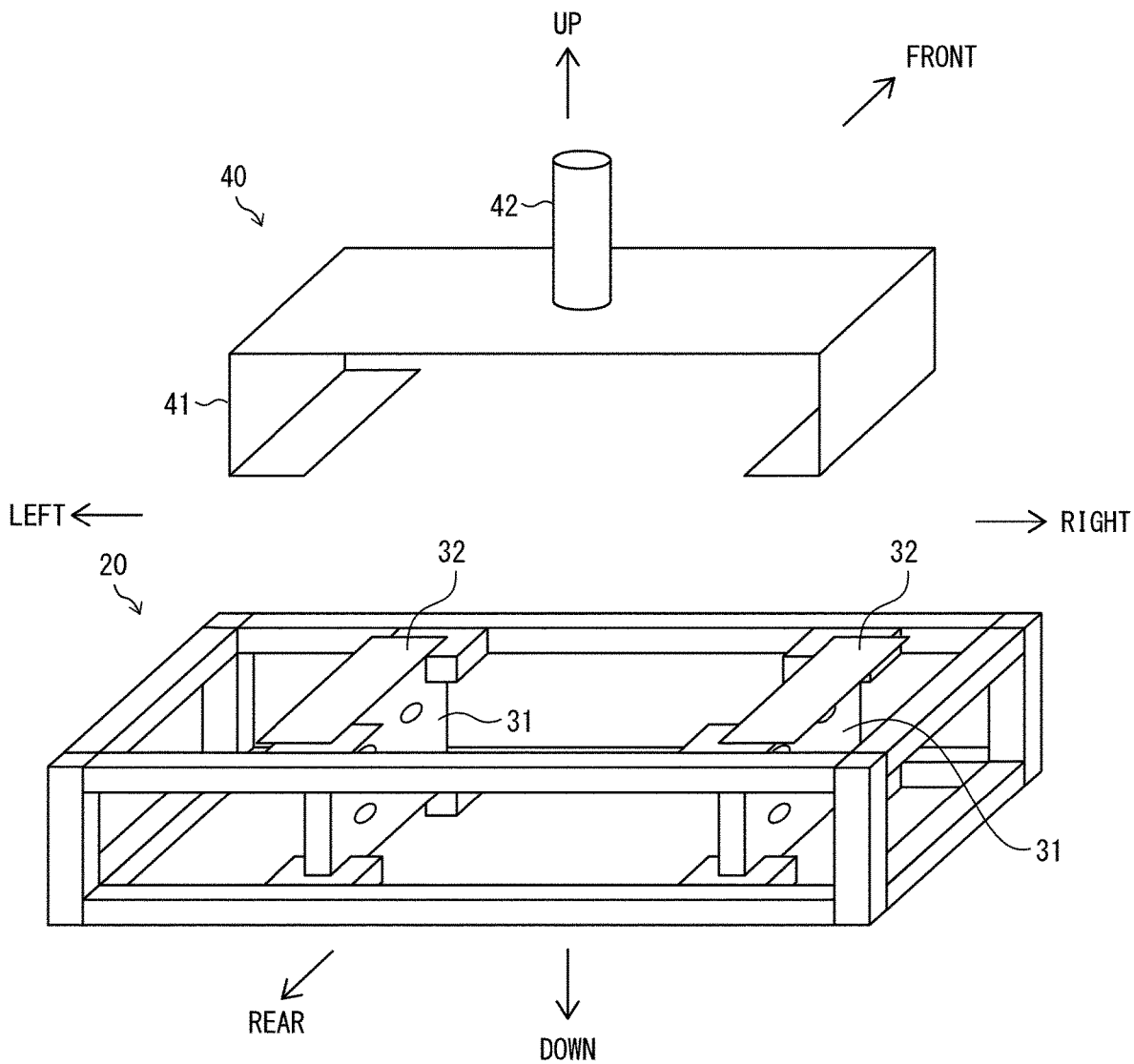
FIG. 4 is a view illustrating a state in which the core wire holder has not yet been attached to a crane in the etching device of FIG. 1.
Figure 5:
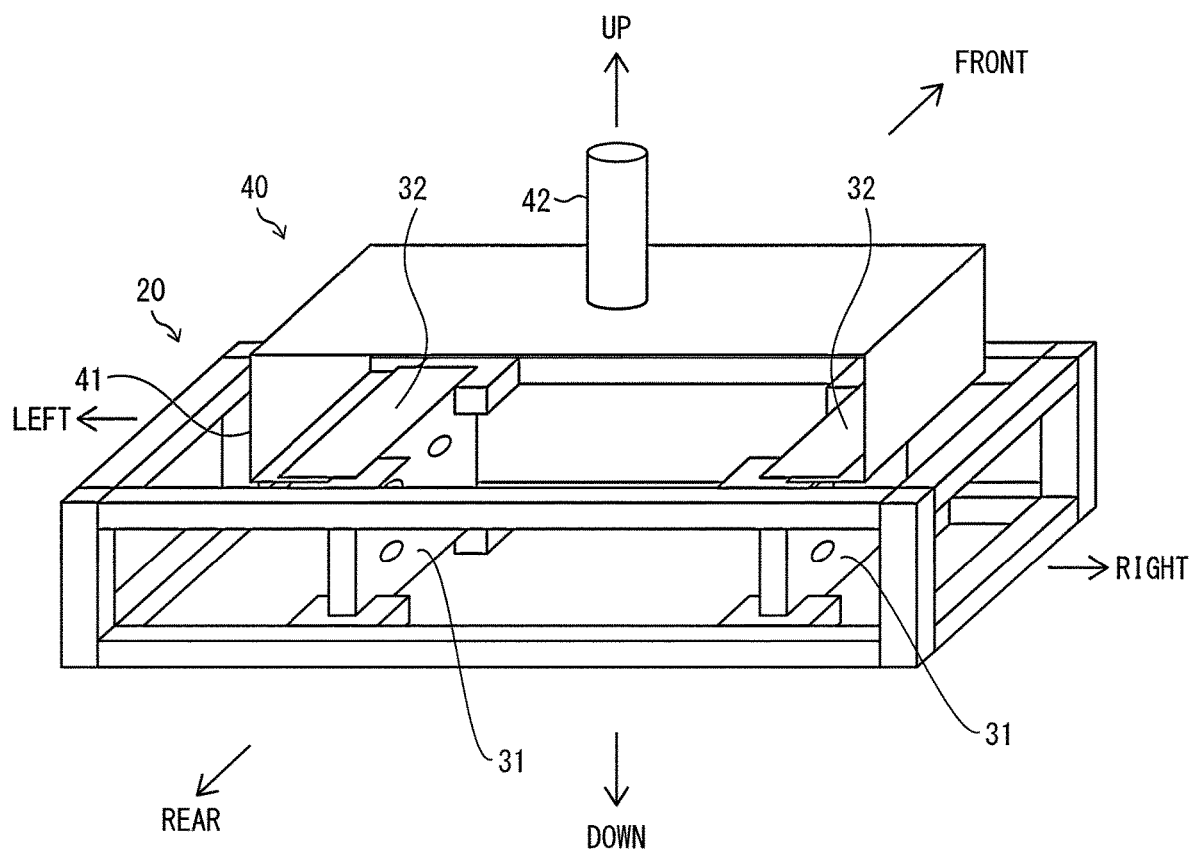
FIG. 5 is a view illustrating a state in which the core wire holder has been attached to the crane of FIG. 4.

As illustrated in FIGS. 4 and 5, the hooks 32 extend outward from the upper surfaces of the core wire support boards 31 in the right-and-left direction, and are attached to arms 41 of the crane 40. Note that the silicon core wires C1 to be supported by the core wire holder 30 are omitted from FIGS. 4 and 5. Attaching the hooks 32 to the arms 41 causes the crane 40 to support the core wire holder 30. This makes it possible to move the core wire holder 30 in the up-and-down direction or the front-and-rear direction. Mounting the core wire holder 30 in the mounting cassette 20 by using a fixing member makes it possible to move the mounting cassette 20 and the core wire holder 30 as a unit in the up-and-down direction or the front-and-rear direction. The connecting sections 33 illustrated in FIG. 2 extend in the right-and-left direction so as to connect two core wire support boards 31 together.

When the core wire holder 30 is moved in the up-and-down or front-and-rear direction in the first etching solution L1 or the second etching solution L2 or in the cleaning water L3, it is possible to change the respective relative positions where the silicon core wires C1 pass through in relation to the through holes 31A. It should be noted that, in this specification, "changing the respective relative positions where the silicon core wires C1 pass through in relation to the through holes 31A" includes changing the positions of contact of the silicon core wires C1 with the peripheries of the through holes 31A in the core wire support boards 31.

In changing the respective relative positions where the silicon core wires C1 pass through in relation to the through holes 31A, it is preferable that the peripheries of the through holes 31A in the core wire support boards 31 be temporarily separated from the silicon core wires C1 so that the entire surface of the silicon core wires C1 is evenly etched. In this regard, since reciprocating the core wire holder 30 in the up-and-down direction causes the core wire support boards 31 to reciprocate in the up-and-down direction, the silicon core wires C1 are likely to be separated from the core wire support boards 31 when the core wire support boards 31 start to move downward after moving upward, as described later. It is therefore preferable to reciprocate the core wire holder 30, which supports the silicon core wires C1, in the up-and-down direction when etching or cleaning the silicon core wires C1.

The hooks 32 are disposed on the two core wire support boards 31, in the present embodiment. However, the present invention is not limited to this. For example, a hook may be disposed at one place that substantially corresponds to the center of the mounting cassette 20, or may be disposed at not less than three places. However, it is preferable to attach the hooks 32 in a manner which enables the connecting sections 33 to be kept in a substantially horizontal position while the crane 40 moves the mounting cassette 20 and the core wire holder 30 having been united together. It is therefore preferable to dispose the hooks 32 on the two respective core wire support boards 31, as illustrated in FIG. 2.

As illustrated in FIG. 1, the crane 40 includes: arms 41; a wire rope 42; a lifting and lowering mechanism 43; a carriage 44; and a rail 45. The arms 41 are designed so as to be extendable in the right-and-left direction. The hooks 32 are attached to the arms 41 as follows: First, the arms 41 are extended in the right-and-left direction while located above the mounting cassette 20, as illustrated in FIG. 4. The arms 41 are then lowered by the lifting and lowering mechanism 43 (illustrated in FIG. 1) and contracted in the right-and-left direction, as illustrated in FIG. 5. In this manner, the hooks 32 can be attached to the arms 41.

As illustrated in FIG. 1, the wire rope 42 connects the arms 41 and the lifting and lowering mechanism 43 to each other. The lifting and lowering mechanism 43 lifts and lowers the arms 41 by, for example, winding and unwinding the wire rope. The carriage 44 is connected to the lifting and lowering mechanism 43 in a manner that allows the lifting and lowering mechanism 43 to move with respect to the rail 45. The rail 45 guides the carriage 44 in the front-and-rear. The rail 45 extends in the front-and-rear direction and above the first etching bath 11, the second etching bath 12 and the cleaning bath 13. The arms 41, the lifting and lowering mechanism 43, and the carriage 44 are connected to a control section (not illustrated) that controls extension and contraction of the arms 41 and lifting and lowering of the arms 41, as well as movements of the carriage 44.

<Etching Method for Silicon Core Wire>

The following description will discuss an etching method for the silicon core wires C1 by using FIG. 1 and FIGS. 6 to 8.

Figure 6:
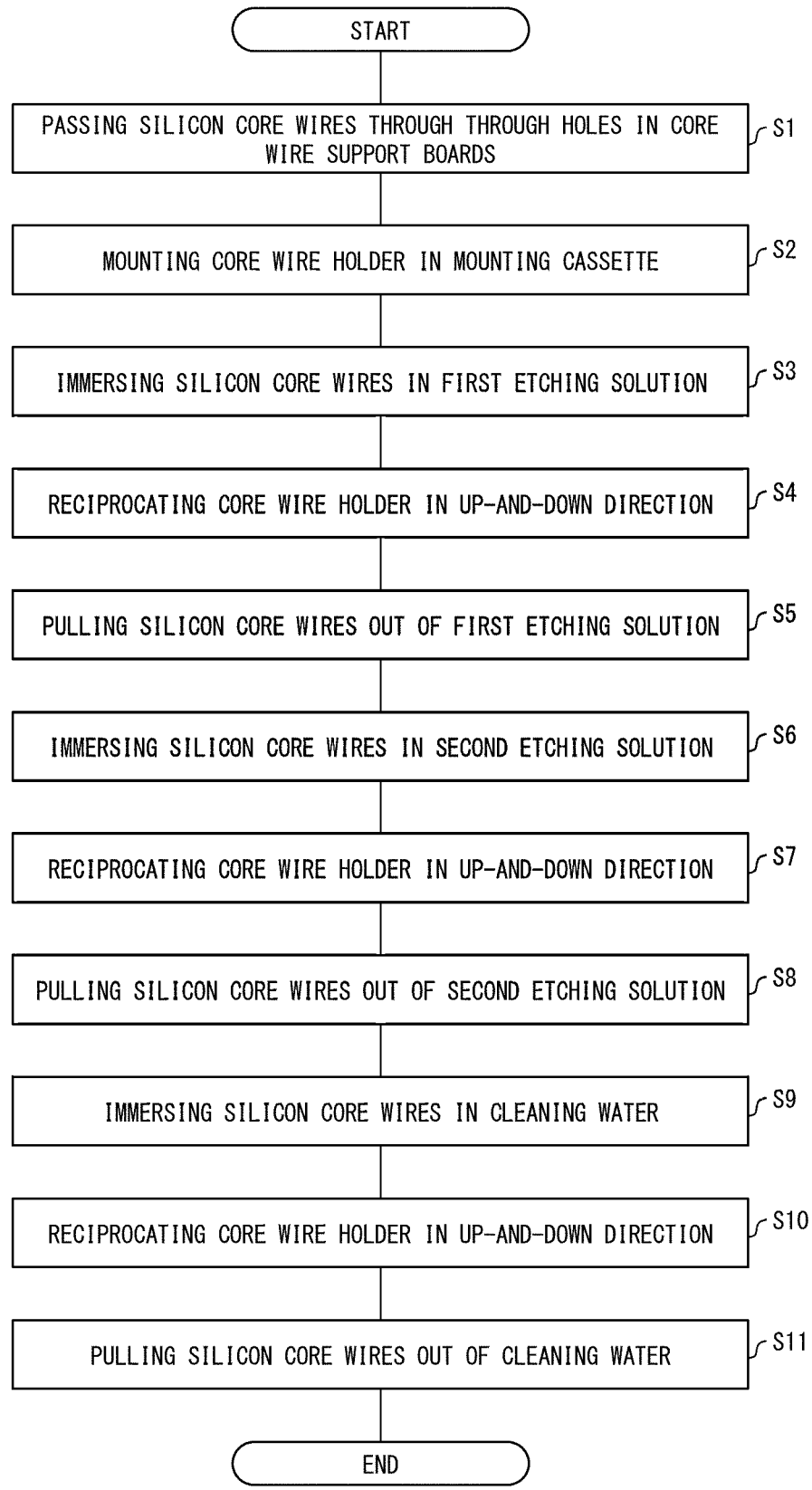
FIG. 6 is a flowchart of a silicon core wire etching method performed by the etching device in accordance with Embodiment 1 of the present invention.

As illustrated in FIG. 6, first, the silicon core wires C1 are passed through the through holes 31A of the two core wire support boards 31 so that the silicon core wires C1 are supported by the two core wire support boards 31 (S1: pass-through step). In S1, one and the other ends of each of the silicon core wires C1 are preferably disposed so as to be beyond the two core wire support boards 31 in the right direction and in the left direction, respectively, in order to prevent the silicon core wires C1 from dropping off the core wire support boards 31 during etching. The silicon core wires C1 protrude beyond the two core wire support boards 31 in the right direction and in the left direction by a length that is not limited to any particular length provided that the length enables prevention of the dropping-off of the silicon core wires C1. For example, the length by which the silicon core wires C1 protrude beyond the two core wire support boards 31 in the right direction and in the left direction is preferably not less than 1% and not more than 15% and more preferably not less than 3% and not more than 10% of the length of the silicon core wires C1.

The core wire holder 30 is then mounted in the mounting cassette 20 by inserting the core wire support boards 31 into the insertion sections 22 (S2). In this state, the core wire holder 30 is fixed to the mounting cassette 20 by using a fixing member (not illustrated) of the mounting cassette 20.

Figure 7:
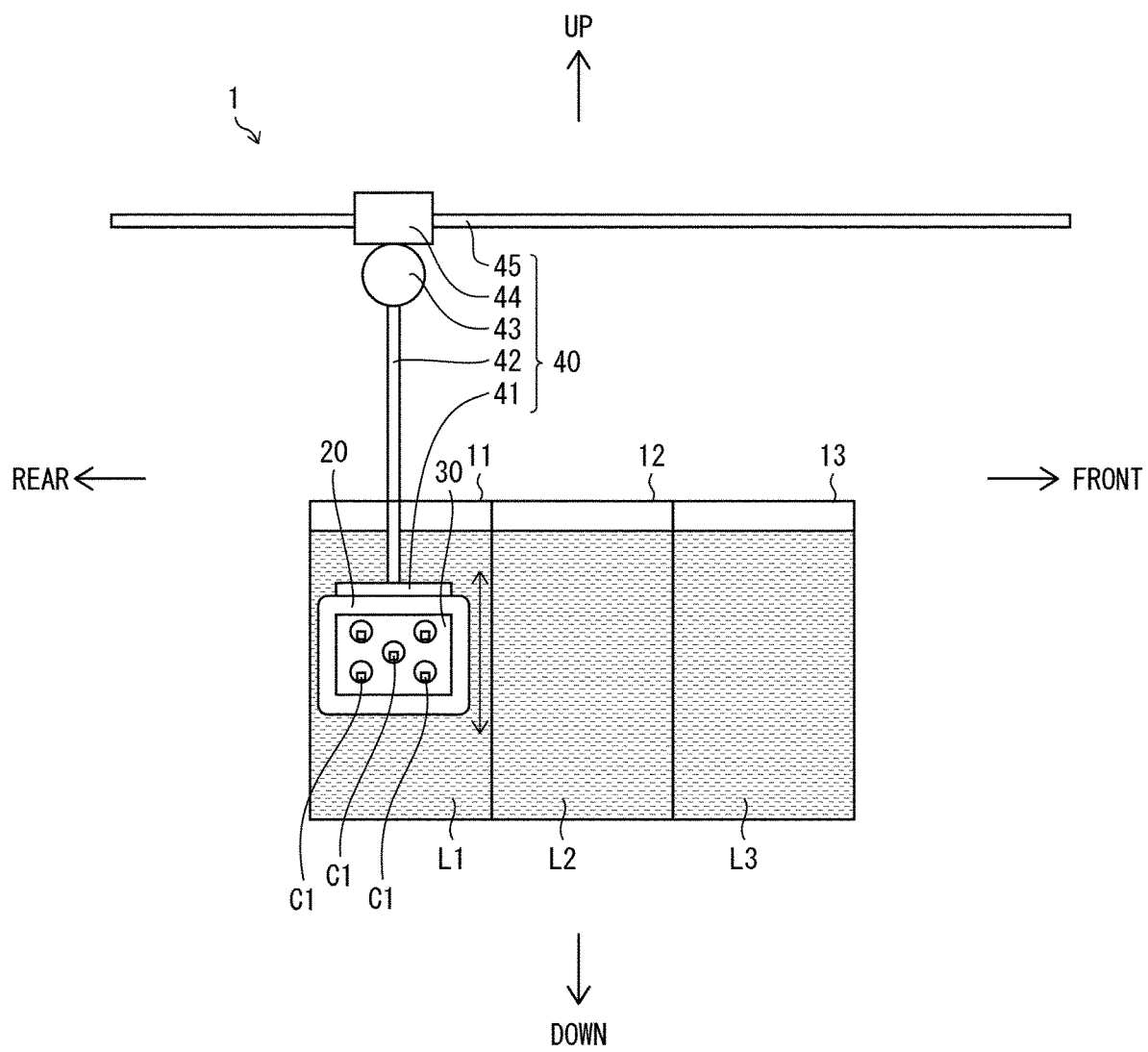
FIG. 7 is a view illustrating a state in which the silicon core wires are immersed in a first etching solution in the etching device of FIG. 1.

Subsequently, the hooks 32 are attached to the arms 41, and the core wire holder 30 mounted in the mounting cassette 20 is lifted by the lifting and lowering mechanism 43 from the initial state of the etching device 1 illustrated in FIG. 1. The carriage 44 is then moved forward along the rail 45, and the core wire holder 30 mounted in the mounting cassette 20 is located above the first etching bath 11. From this state, the core wire holder 30 mounted in the mounting cassette 20 is lowered by the lifting and lowering mechanism 43, so that the silicon core wires C1 supported by the core wire support boards 31 are immersed in the first etching solution L1, as illustrated in FIG. 7 (S3: first immersing step).

While the silicon core wires C1 are immersed in the first etching solution L1 in this manner, the core wire holder 30 is reciprocated in the up-and-down direction, so that the respective relative positions where the silicon core wires C1 pass through in relation to the through holes 31A are changed (S4: first position change step). The core wire holder 30 is reciprocated at a rate that may be appropriately determined according to the shapes, sizes, and the like of the etching device 1 and the silicon core wires C1. The rate is preferably such that the silicon core wires C1 are not damaged by the contact with the core wire support boards 31. It is preferable that a rate at which the respective relative positions where the silicon core wires C1 pass through in relation to the through holes 31A are changed be, for example, not less than 30 times per minute and not more than 90 times per minute. In particular, a rate at which the core wire holder 30 is reciprocated in the up-and-down direction is preferably not less than 30 times per minute and not more than 90 times per minute.

In S4, locations, on the surfaces of the silicon core wires C1, of contact with the core wire support boards 31 change as the core wire holder 30 reciprocates. This enables contact between the entire surfaces of the silicon core wires C1 and the first etching solution L1. It is therefore possible to evenly etch the entire surfaces of the silicon core wires C1. Since the silicon core wires C1 are supported by the core wire support boards 31 with the silicon core wires C1 being passed through the through holes 31A formed in the core wire support boards 31, it is further possible to prevent the silicon core wires C1 from falling off the core wire support boards 31.

Reciprocating the core wire holder 30 in the up-and-down direction causes the core wire support boards 31 to reciprocate in the up-and-down direction, so that the silicon core wires C1 are likely to separate from the core wire support boards 31 when the core wire support boards 31 start to move downward after moving upward. This makes the entire surfaces of the silicon core wires C1 likely to have contact with the first etching solution L1 during etching. It is therefore possible to evenly etch the entire surfaces of the silicon core wires C1. Since the core wire holder 30 does not need to move in a horizontal direction, it is further possible to reduce the size of the etching device 1 in the horizontal direction and therefore make the etching device 1 more compact.

It is preferable to shape the peripheries of the through holes 31A in the core wire support boards 31 into a continuous, curved line. In this case, the area of contact between the silicon core wires C1 and the core wire support boards 31 is likely to decrease, and the silicon core wires C1 is therefore likely to separate from the core wire support boards 31. Further, since the peripheries of the through holes 31A in the core wire support boards 31 are each continuous, it is possible to prevent the silicon core wires C1 from dropping off the core wire support boards 31. As a result, it is possible to evenly etch the entire surfaces of the silicon core wires C1 with the silicon core wires C1 being stably supported by the core wire support boards 31.

Providing the core wire support boards 31 with the plurality of through holes 31A enables the core wire support boards 31 to support the plurality of silicon core wires C1. This makes it possible to efficiently etch the plurality of silicon core wires C1.

Next, after the silicon core wires C1 are etched in the first etching solution L1, the silicon core wires C1 are pulled out of the first etching solution L1 by lifting the core wire holder 30 mounted in the mounting cassette 20 by using the lifting and lowering mechanism 43 (S5). Subsequently, the carriage 44 is moved forward along the rail 45 so that the core wire holder 30 mounted in the mounting cassette 20 is located above the second etching bath 12.

The silicon core wires C1 are then immersed in the second etching solution L2 in the same manner as in S3 to S5 (S6: first immersing step), the core wire holder 30 is reciprocated in the up-and-down direction (S7: first position change step), and the silicon core wires C1 are pulled out of the second etching solution L2 (S8).

The carriage 44 is then moved along the rail 45 so that the core wire holder 30 mounted in the mounting cassette 20 is located above the cleaning bath 13. Subsequently, the silicon core wires C1 are immersed in the cleaning water L3 in the same manner as in S3 to S5 (S9: second immersing step), the core wire holder 30 is reciprocated in the up-and-down direction (S10: second position change step), and the silicon core wires C1 are pulled out of the cleaning water L3 (S11).

In S10, the locations, on the surfaces of the silicon core wires C1, of contact with the core wire support boards 31 change as the core wire holder 30 reciprocates. This enables the entire surfaces of the silicon core wires C1 to have contact with the cleaning water L3. It is therefore possible to evenly clean the entire surfaces of the silicon core wires C1.

Figure 8:
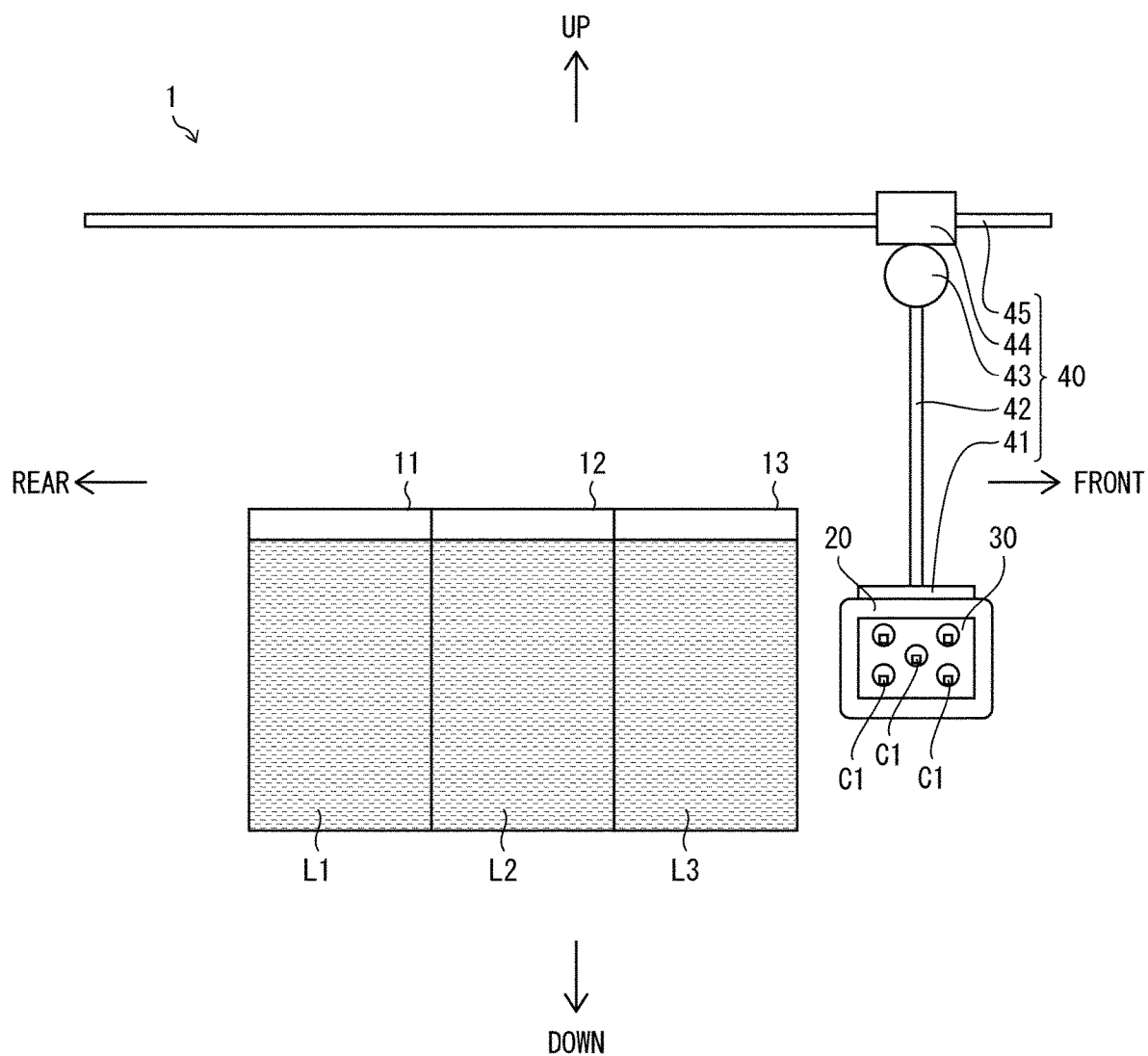
FIG. 8 is a view illustrating a state in which the silicon core wires have been etched and cleaned in the etching device of FIG. 1.

Next, the carriage 44 is moved along the rail 45 so as to be located forward of the cleaning bath 13, and the core wire holder 30 mounted in the mounting cassette 20 is then lowered by the lifting and lowering mechanism 43, as illustrated in FIG. 8. The hooks 32 are detached from the arms 41, the core wire holder 30 is demounted from the mounting cassette 20, and the silicon core wires C1 are then removed from the two core wire support boards 31, so that the silicon core wires C1 having been etched can be obtained.

Variation

In the present embodiment, the mounting cassette 20 includes the insertion sections 22 each having the shape of a pair of protrusions, and the core wire support boards 31 are inserted between the protrusions, paired together, of the insertion sections 22. However, the present invention is not limited to this. The mounting cassette 20 may have grooves in which the core wire support boards 31 are to be inserted, instead of the insertion sections 22 each shaped into protrusions.

In the present embodiment, the silicon core wires C1 are passed through the through holes 31A in the core wire support boards 31, and the core wire holder 30 is then mounted in the mounting cassette 20. However, the present invention is not limited to this. The silicon core wires C1 may be passed through the through holes 31A in the core wire support boards 31 after the core wire holder 30 is mounted in the mounting cassette 20.

In the present embodiment, the respective relative positions where the silicon core wires C1 pass through in relation to the through holes 31A are changed by reciprocating, in the up-and-down direction, the mounting cassette 20 and the core wire holder 30 having been united. However, the present invention is not limited to this. For example, the respective relative positions where the silicon core wires C1 pass through in relation to the through holes 31A may be changed by reciprocating, in the up-and-down direction, the first etching bath 11, the second etching bath 12, and the cleaning bath 13.

Alternatively, the respective relative positions where the silicon core wires C1 pass through in relation to the through holes 31A may be changed by forming a forced circulating flow in the first etching solution L1, the second etching solution L2, or the cleaning water L3 and directing the forced circulating flow toward the silicon core wires C1. The forced circulating flow may be formed by providing a jet nozzle in the first etching bath 11, the second etching bath 12 or the cleaning bath 13 and ejecting a circulating liquid through the jet nozzle.

Embodiment 2

Figure 9:
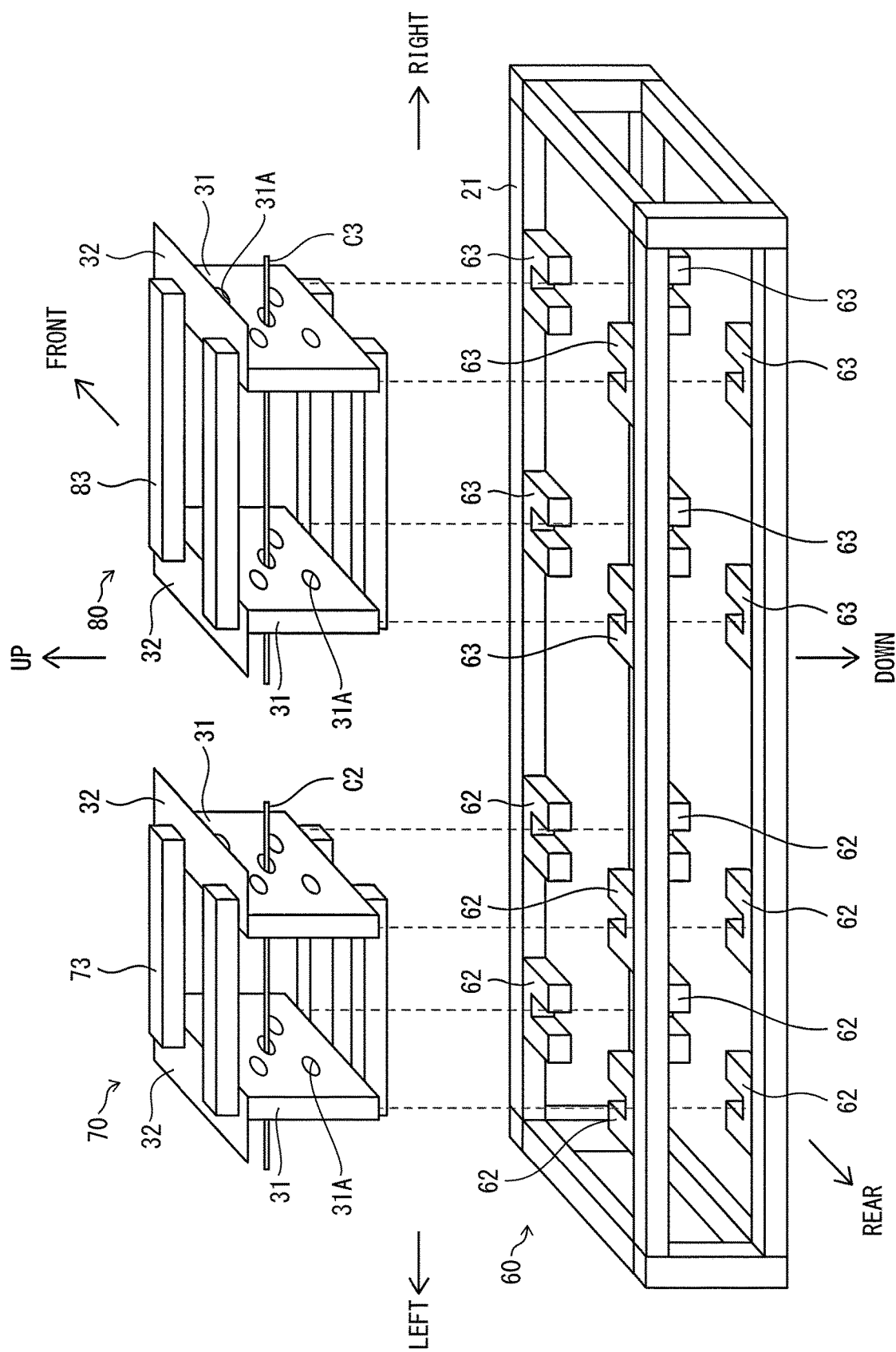
FIG. 9 is an exploded view schematically illustrating a mounting cassette and a core wire holder of an etching device in accordance with Embodiment 2 of the present invention.

The following description will discuss another embodiment of the present invention. For convenience of description, a member having the same function as a member described in the above-described embodiment described above is assigned with the same reference sign that the member described in the above-described embodiment is assigned with, and the description of the member is omitted. As illustrated in FIG. 9, Embodiment 2 differs from Embodiment 1 in that a short-length core wire holder 70 and a middle-length core wire holder 80 are mounted in a mounting cassette 60.

The short-length core wire holder 70 includes: two core wire support boards 31; hooks 32; and connecting sections 73. The connecting sections 73 are shorter in the right-and-left direction than the connecting sections 33 illustrated in FIG. 2. The short-length core wire holder 70 is therefore suitable to support short-length silicon core wires C2 that are shorter in the right-and-left direction than the silicon core wires C1.

The middle-length core wire holder 80 illustrated in FIG. 9 includes: two core wire support boards 31; hooks 32; and connecting sections 83. The connecting sections 83 are longer in the right-and-left direction than the connecting sections 73 and are shorter in the right-and-left direction than the connecting sections 33 illustrated in FIG. 2. The middle-length core wire holder 80 is therefore suitable to support middle-length silicon core wires C3 that are longer in the right-and-left direction than the short-length silicon core wires C2 and are shorter in the right-and-left direction than the silicon core wires C1. Although the short-length core wire holder 70 and the middle-length core wire holder 80 support a single short-length silicon core wire C2 and a single middle-length silicon core wire C3, respectively in FIG. 9, the short-length core wire holder 70 and the middle-length core wire holder 80 may each support a plurality of silicon core wires.

As illustrated in FIG. 9, the mounting cassette 60 includes: a frame 21; eight insertion sections for short length 62; and eight insertion sections for middle length 63. The eight insertion sections for short length 62 and the eight insertion sections for middle length 63 are provided to the rod-shaped sections included in the frame 21 and extending in the right-and-left direction. Each of the eight insertion sections for short length 62 and each of the eight insertion sections for middle length 63 have the shape of a pair of protrusions facing each other in the right-and-left direction.

The positions of the eight insertion sections for short length 62 in the right-and-left direction correspond to positions at which the two core wire support boards 31 of the short-length core wire holder 70 are disposed. Further, the positions of the eight insertion sections for middle length 63 in the right-and-left direction correspond to positions at which the two core wire support boards 31 of the middle-length core wire holder 80 are disposed.

In FIG. 9, the etching device 1 includes the short-length core wire holder 70 and the middle-length core wire holder 80, which each have hooks 32. The total number of the hooks 32 is four. In a case where both the short-length core wire holder 70 and the middle-length core wire holder 80 are fixed to the mounting cassette 60, one of the hooks 32 of each of the short-length core wire holder 70 and the middle-length core wire holder 80 may be attached to the arms 41 (illustrated in FIG. 4) of the crane 40, provided that it is possible to keep the mounting cassette 60 in a horizontal position. Alternatively, a crane 40 that has four arms 41 may be prepared so that the arms 41 are attached to all of the four hooks 32.

In some of the cases where polycrystalline silicon is produced by the Siemens process, the top portions of the two, long, long-length silicon core wires that are set upright in a substantially vertical direction are connected to each other by using a short-length silicon core wire C2, and the two long-length silicon core wires and the short-length silicon core wire C2 are energized and heated as a unit. A long-length silicon core wire can be produced by, for example, welding a short-length silicon core wire C2 and a middle-length silicon core wire C3.

The above-described configuration makes it possible to select the short-length core wire holder 70 or the middle-length core wire holder 80 according to the length of the short-length silicon core wires C2 or middle-length silicon core wires C3. This enables the core wire support boards 31 to securely support the silicon core wires C2 and C3 regardless of the lengths of the silicon core wires C2 and C3.

Variation

In the present embodiment, the mounting cassette 20 includes eight insertion sections for short length 62 and eight insertion sections for middle length 63. However, the present invention is not limited to this. The mounting cassette 20 may include a total of more than 16 insertion sections that are provided different positions in the right-and-left direction. In this case, the distance between two core wire support boards 31 is more finely adjustable by changing the positions of the insertion sections in which the core wire support boards 31 are to be inserted. This makes it possible to more finely adjust the distance between the two core wire support boards 31 according to the length of the silicon core wires C1. Accordingly, it is possible for the core wire support boards 31 to more securely support the silicon core wires C2 and C3 regardless of the length of the silicon core wires C2 and C3.

Embodiment 3

As illustrated in FIG. 10, Embodiment 3 differs from Embodiment 1 in that the mounting cassette 20, rather than the core wire holder 30, includes hooks 233 that are attachable and detachable. For convenience of description, a member having the same function as a member described in the above-described embodiments is assigned with the same reference sign that the member described in the above-described embodiments is assigned with, and the description of the member is omitted. Further, the silicon core wires C1 to be supported by the core wire holder 30 are omitted in FIG. 10.

The mounting cassette 20 includes two fixing members 23 for fixing the core wire holder 30 to the mounting cassette 20. The two fixing members 23 are apart from each other in the right-and-left direction. Each of the two fixing members 23 includes: two attachment sections 231; a connecting section 232; and a hook 233. The two attachment sections 231, which are provided so as to face each other in the front-and-rear direction, are designed so as to be attached, in an attachable and detachable manner, to the upper side of the rod-shaped sections of the frame 21 that extend in the right-and-left direction. It is possible to attach the fixing members 23 to the frame 21 or detach the fixing members 23 from the frame 21 by attaching the attachment sections 231 to the frame 21 or detaching the attachment sections 231 from the frame 21. In this case, the etching and cleaning of the silicon core wires C1 are performed with the core wire holder 30 being fixed to the mounting cassette 20.

The connecting section 232 is a plate-shaped member for connecting the two attachment sections 231 which face each other in the front-and-rear direction. The hooks 233, which extend outside from the upper surface of the connecting section 232 in the right-and-left direction, are designed so as to be attached to the arms 41 of the crane 40.

The silicon core wires C1 are etched as follows: First, the two core wire support boards 31 supporting the silicon core wires C1 are inserted into the insertion sections 22 while the fixing members 23 are detached from the frame 21. Next, the fixing members 23 are attached to the frame 21, and the core wire holder 30 are fixed to the mounting cassette 20. Subsequently, the hooks 233 of the mounting cassette 20 are attached to the arms 41. After this, the same process flow as in Embodiment 1 follows.

With the configuration in which the mounting cassette 20 includes the hooks 233 which are attachable and detachable as described above, it is possible to easily adjust the positions of the hooks 233 by, for example, changing the positions of the fixing members 23. This makes it possible to easily keep, in a substantially horizontal position, the rod-shaped sections of the mounting cassette 20 that each extend in the front-and-rear direction or in the right-and-left direction even when the mounting cassette 20 is moved upward or downward by the crane 40.

Variation

In Embodiment 3, as in Embodiment 2, the short-length core wire holder 70 and the middle-length core wire holder 80 may be designed so as to be mounted in the mounting cassette 60 and fixed, by using the fixing members 23, to the mounting cassette 60. Even in this case, it is possible to easily adjust the positions of the hooks 233 by changing the positions of the fixing members 23. This makes it possible to easily keep, in a substantially horizontal position, the rod-shaped sections of the mounting cassette 20 that each extend in the front-and-rear direction or in the right-and-left direction even when the mounting cassette 20 is moved upward or downward by using the crane 40. Since a single mounting cassette 20 includes two hooks 233, the crane 40 may include only two arms 41. This eliminates the need to give a complex configuration to the etching device 1.

[Main Points]

A silicon core wire etching device in accordance with an aspect of the present invention includes: an etching bath for holding an etching solution in which a silicon core wire is to be immersed; a plurality of core wire support members for supporting the silicon core wire, the plurality of core wire support members each having at least one hole, the at least one hole including a hole through which the silicon core wire is to pass; and a position change mechanism for changing, while the silicon core wire is passed through the plurality of core wire support members and immersed in the etching solution, a relative position where the silicon core wire passes through in relation to the hole.

It should be noted that, in this specification, "hole" includes not only a hole formed by a periphery having a continuous shape, i.e., a closed shape but also a hole formed by a periphery having an open part that is shorter in length than the diameter of the minimum enclosing circle for the cross section of the silicon core wire. Therefore, the periphery of the hole in each of the core wire support members may have an open part that is shorter in length than the diameter of the minimum enclosing circle for the cross section of the silicon core wire.

With this configuration, the locations, on the surface of the silicon core wire, of contact with the core wire support members change by changing, by using the position change mechanism and while the silicon core wire is passed through the plurality of core wire support members and is immersed in the etching solution, the relative position where the silicon core wire passes through in relation to the hole. This enables the entire surface of the silicon core wire to have contact with the etching solution during etching and therefore makes it possible to evenly etch the entire surface of the silicon core wire. Since the silicon core wire is supported by the core wire support members with the silicon core wire being passed through the holes formed in the core wire support members, it is possible to prevent the silicon core wire from falling off the core wire support members.

According to the silicon core wire etching device in accordance with an aspect of the present invention, the position change mechanism may reciprocate the plurality of core wire support members in an up-and-down direction. This configuration, in which the core wire support members reciprocate in the up-and-down direction, makes the silicon core wire likely to separate from the core wire support members when the core wire support members start to move downward after moving upward. This makes the entire surface of the silicon core wire likely to have contact with the etching solution during etching. It is therefore possible to evenly etch the entire surface of the silicon core wire. Since the core wire support members do not need to move in the horizontal direction, it is also possible to reduce the dimension of the etching device in the horizontal direction. This makes it possible to make the etching device more compact.

According to the silicon core wire etching device in accordance with an aspect of the present invention, the at least one hole may be formed by a periphery shaped into a continuous, curved line. This configuration makes the area of contact between the silicon core wire and the core wire support members likely to decrease, and therefore makes the silicon core wire likely to separate from the core wire support members. Since the periphery of the hole is continuous, i.e., closed, it is possible to prevent the silicon core wire from dropping off the core wire support members. This makes it possible to evenly etch the entire surface of the silicon core wire with the silicon core wire being stably supported by the core wire support members.

According to the silicon core wire etching device in accordance with an aspect of the present invention, the silicon core wire passes through the hole formed in each of at least two core wire support members of the plurality of core wire support members, and the at least two core wire support members are apart from each other by a distance that may be adjustable according to the length of the silicon core wire. This configuration enables the plurality of core wire support members to securely support the silicon core wire regardless of the length of the silicon core wire.

According to the silicon core wire etching device in accordance with an aspect of the present invention, the at least one hole includes a plurality of holes, and the plurality of core wire support members may each have the plurality of holes. This configuration enables the core wire support members to support a plurality of silicon core wires, and therefore makes it possible to efficiently etch the plurality of silicon core wires.

The silicon core wire etching device in accordance with an aspect of the present invention further includes a cleaning bath for holding cleaning water in which the silicon core wire is to be immersed. The position change mechanism may change, while the silicon core wire having been immersed in the etching solution is passed through the plurality of core wire support members and immersed in the cleaning water, a relative position where the silicon core wire passes through in relation to the hole.

With this configuration, locations, on the surface of the silicon core wire, of contact with the core wire support members are changed by changing, by the position change mechanism and while the silicon core wire is passed through the plurality of core wire support members and immersed in the cleaning water, the relative position where the silicon core wire passes through in relation to the hole. This enables the entire surface of the silicon core wire to have contact with the cleaning water during cleaning and therefore makes it possible to evenly clean the entire surface of the silicon core wire.

A silicon core wire etching method in accordance with an aspect of the present invention includes: a pass-through step of passing a silicon core wire through a hole formed in each of a plurality of core wire support members for supporting the silicon core wire; a first immersing step of immersing the silicon core wire supported by the plurality of core wire support members in an etching solution; and a first position change step of changing a relative position where the silicon core wire passes through in relation to the hole.

The silicon core wire etching method in accordance with an aspect of the present invention may further include, after the first position change step: a second immersing step of immersing the silicon core wire supported by the plurality of core wire support members in cleaning water; and a second position change step of changing, while the silicon core wire is immersed in the cleaning water, a relative position where the silicon core wire passes through in relation to the hole.

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

The following description will discuss Examples of the present invention.

Example 1

<Preparation of Silicon Core Wires C1>

As the silicon core wires C1 to be used in Example 1, nine silicon core wires C1 were prepared. Each of the nine silicon core wires C1 had a cross section that was orthogonal to an extending direction and that was a square having sides of 10 mm, and had the shape of a prism having a length in the extending direction of 1200 mm.

<Preparation of Core Wire Holder 30>

The core wire holder 30 was prepared as follows: As the core wire support boards 31 illustrated in FIG. 2, two core wire support boards 31 each being 10 mm thick were prepared. Each of the two core wire support boards 31 had nine through holes 31A each of which was shaped into a circle having a diameter of 20 mm and which were formed in a regular arrangement. The core wire support boards 31 were disposed 1 m apart from each other in the right-and-left direction such that the nine through holes 31A of one of the core wire support boards 31 were each aligned with the corresponding one of the nine through holes 31A of the other one of the core wire support boards 31 in the up-and-down direction and in the front-and-rear direction. The connecting sections 33 and the hooks 32 were attached to the core wire support boards 31 as illustrated in FIG. 2.

<Disposing Silicon Core Wires C1 to Core Wire Holder 30: Pass-Through Step>

Two respective through holes 31A of the two core wire support boards 31 that are aligned with each other in the up-and-down direction and in the front-and-rear direction are collectively referred to as a set of through holes 31A. In the next step, the silicon core wires C1 were inserted into nine respective sets of through holes 31A. In the inserting, each of the silicon core wires C1 was disposed in the core wire holder 30 such that both ends of the silicon core wire protruded beyond the core wire support boards 31 in the right direction and in the left direction by approximately 100 mm.

<Mounting Core Wire Holder 30 in Mounting Cassette 20>

The core wire holder 30 supporting the silicon core wires C1 was mounted in the mounting cassette 20 illustrated in FIG. 2 by inserting the core wire support boards 31 in the insertion sections 22 of the mounting cassette 20. In this state, the core wire holder 30 was fixed to the mounting cassette 20 by using a fixing member (not illustrated) of the mounting cassette 20 so that the core wire holder 30 and the mounting cassette 20 were united with each other.

<Etching: First Immersing Step and First Position Change Step>

As illustrated in FIGS. 4 and 5, the hooks 32 of the core wire holder 30 were attached to the arms 41 of the crane 40 so that the mounting cassette 20 and the core wire holder 30 having been united with each other were movable in the up-and-down direction and in the front-and-rear direction by using the crane 40.

Next, as illustrated in FIG. 7, the mounting cassette 20 and the core wire holder 30 having been united with each other were moved by the crane 40, and the entirety of the core wire holder 30 and the entirety of the mounting cassette 20 were immersed into the first etching solution L1 held in the first etching bath 11 (first immersing step). The first etching solution L1 was an aqueous solution containing $HNO_3$ at a concentration of 67 mass % and containing HF at a concentration of 2 mass %. The mounting cassette 20 and the core wire holder 30 having been united with each other were reciprocated in the up-and-down direction for five minutes at a rate of 40 times per minute. During the reciprocation, changes of respective relative positions where the silicon core wires C1 pass through in relation to the through holes 31A were visually confirmed (first position change step).

Next, the mounting cassette 20 and the core wire holder 30 having been united with each other were lifted by the crane 40, and pulled out of the first etching solution L1. Subsequently, the mounting cassette 20 and the core wire holder 30 having been united with each other were moved by the crane 40 so that the entirety of the core wire holder 30 supporting the silicon core wires C1 and the entirety of the mounting cassette 20 were immersed in the second etching solution L2 held in the second etching bath 12 (first immersing step). The second etching solution L2 was an aqueous solution containing $HNO_3$ at a concentration of 64 mass % and containing HF at a concentration of 4 mass %. The mounting cassette 20 and the core wire holder 30 having been united with each other were reciprocated in the up-and-down direction for 10 minutes at a rate of 40 times per minute. During the reciprocation, changes of respective relative positions where the silicon core wires C1 pass through in relation to the through holes 31A were visually confirmed (first position change step).

<Cleaning: Second Immersing Step and Second Position Change Step>

Next, the mounting cassette 20 and the core wire holder 30 having been united with each other were lifted by the crane 40, and pulled out of the second etching solution L2. The mounting cassette 20 and the core wire holder 30 having been united with each other were moved by the crane 40 so that the entirety of the core wire holder 30 supporting the silicon core wires C1 and the entirety of the mounting cassette 20 were immersed in the cleaning water L3 held in the cleaning bath 13 (second immersing step). The cleaning water L3 was pure water having an electrical resistivity of 2 $M\Omega cm$. The mounting cassette 20 and the core wire holder 30 having been united with each other were reciprocated in the up-and-down direction for two minutes at a rate of 40 times per minute. During the reciprocation, changes of respective relative positions where the silicon core wires C1 pass through in relation to the through holes 31A were visually confirmed (second position change step).

<Drying>

Subsequently, the mounting cassette 20 and the core wire holder 30 having been united with each other were pulled out of the cleaning bath 13, and an excessive amount of the cleaning water L3 adhering to the core wire holder 30 and the mounting cassette 20 was removed. The silicon core wires C1 was then dried with the silicon core wires C1 being disposed in the core wire holder 30 and the mounting cassette 20.

<Evaluation•Observation>

After dried, the nine silicon core wires C1 thus obtained were visually observed. It was observed that the entire surface of each of the nine silicon core wires C1 was even and had a metallic luster. This indicated the absence of unevenness of etching. None of the nine silicon core wires C1 dropped off the core wire holder 30 throughout the etching step and the cleaning step.

Comparative Example 1

A process was performed which is similar to that for Example 1 except that, in <etching> and <cleaning> in Example 1, the mounting cassette 20 and the core wire holder 30 having been united with each other were immersed while not being reciprocated in the up-and-down direction but being at rest. The immersion was performed for 5 minutes in the first etching solution L1, for 10 minutes in the second etching solution L2, and for 2 minutes in the cleaning water L3.

After dried, the nine silicon core wires C1 thus obtained were visually observed. It was observed that, as to all of the nine silicon core wires C1, locations, on the nine silicon core wires C1, of contact with the peripheries of the through holes 31A in the core wire support boards 31 and the vicinities of the locations of contact had a luster different from that of the other locations. This indicated that unevenness of etching clearly occurred. Note that, in this specification, locations, on the silicon core wires C1, of contact with the peripheries of the through holes 31A in the core wire support boards 31 are referred to as locations, on the silicon core wires C1, of contact with the core wire support boards 31.

Comparative Example 2

A process was performed which is similar to that for Example 1 except that, in <etching> in Example 1, the mounting cassette 20 and the core wire holder 30 having been united with each other were immersed while not being reciprocated in the up-and-down direction but being at rest. Note that Comparative Example 2 differs from Comparative Example 1 in that the mounting cassette 20 and the core wire holder 30 having been united with each other were reciprocated in the up-and-down direction for two minutes at a rate of 40 times per minute in <cleaning: second immersing step and second position change step>.

After dried, the nine silicon core wires C1 thus obtained were visually observed. It was observed that, as to all of the nine silicon core wires C1, locations, on the silicon core wires C1, of contact with the core wire support boards 31 and the vicinities of the locations of contact had a luster different from that of the other locations. This indicated that unevenness of etching clearly occurred. It has been therefore shown that, in a case where the mounting cassette 20 and the core wire holder 30 are not reciprocated in the etching step, it is not possible to avoid unevenness of etching even when relative positions of the silicon core wires C1 are changed in the cleaning step.

Example 2

A process was performed which is similar to that for Example 1 except that two core wire support boards 31 each of which has nine through holes 31A that are each shaped into a square having sides of 20 mm and that are formed in a regular arrangement and each of which is 10 mm thick were used in the core wire holder 30.

After dried, nine silicon core wires C1 thus obtained were visually observed. It was observed that five out of the nine silicon core wires C1 had a surface the entirety of which was even and had a metallic luster. This indicated the absence of unevenness of etching. It was further observed that, as to the remaining four silicon core wires C1, locations, on the four silicon core wires C1, of contact with the core wire support boards 31 and the vicinities of the locations of contact had a luster somewhat different from that of the other locations. This indicated that unevenness of etching slightly occurred. However, the unevenness of etching observed in Example 2 was so slighter than the unevenness of etching in Comparative Examples 1 and 2 that the judgement of the unevenness was difficult, and was not problematic.

Example 3

A process was performed which is similar to that for Example 2 except that, in <etching>, the mounting cassette 20 and the core wire holder 30 having been united with each other were reciprocated at a rate of 80 times per minute. Specifically, the mounting cassette 20 and the core wire holder 30 having been united with each other were reciprocated in the up-and-down direction for five minutes at a rate of 80 times per minute while the silicon core wires C1 were immersed in the first etching solution L1. Further, the mounting cassette 20 and the core wire holder 30 having been united with each other were reciprocated in the up-and-down direction for ten minutes at a rate of 80 times per minute while the silicon core wires C1 were immersed in the second etching solution L2.

After dried, nine silicon core wires C1 thus obtained were visually observed. It was observed that all of the nine silicon core wires C1 had a surface the entirety of which was even and had a metallic luster. This indicated the absence of unevenness of etching.

Example 4

A process was performed which is similar to that for Example 1 except that two core wire support boards 31 each of which had nine through holes 31A that were each shaped into a regular hexagon inscribed in a circle having a diameter of 20 mm and that are formed in a regular arrangement and each of which is 10 mm thick were used in the core wire holder 30.

After dried, nine silicon core wires C1 thus obtained were visually observed. It was observed that seven out of the nine silicon core wires C1 had a surface the entirety of which was even and had a metallic luster. This indicated the absence of unevenness of etching. It was further observed that, as to the remaining two silicon core wires C1, locations, on the two silicon core wires C1, of contact with the core wire support boards 31 and the vicinities of the locations of contact had a luster somewhat different from that of the other locations. This indicated that unevenness of etching slightly occurred. However, the unevenness of etching observed in Example 4 was so slighter than the unevenness of etching in Comparative Examples 1 and 2 that the judgement of the unevenness was difficult, and was not problematic.

Example 5

A process was performed which is similar to that for Example 4 except that, in <etching>, the mounting cassette 20 and the core wire holder 30 having been united with each other were reciprocated at a rate of 60 times per minute. Specifically, the mounting cassette 20 and the core wire holder 30 having been united with each other were reciprocated in the up-and-down direction for five minutes at a rate of 60 times per minute while the silicon core wires C1 were immersed in the first etching solution L1. Further, the mounting cassette 20 and the core wire holder 30 having been united with each other were reciprocated in the up-and-down direction for ten minutes at a rate of 60 times per minute while the silicon core wires C1 were immersed in the second etching solution L2.

After dried, nine silicon core wires C1 thus obtained were visually observed. It was observed that the entire surface of each of the nine silicon core wires C1 was even and had a metallic luster. This indicated the absence of unevenness of etching.

It has been shown by a comparison between Examples 1, 2, and 4 that the peripheries of the through holes 31A in the core wire support boards 31 are preferably shaped into a rounded, smooth, curved line, such as a circle indicated in Example 1. It has been further shown by a comparison between Examples 2 and 4 that, when the peripheries of the through holes 31A in the core wire support boards 31 are closer to a circle in shape, it is possible to more evenly etch the entire surfaces of the silicon core wires C1 even at a small moving speed in the up-and-down direction.

It has been shown by a comparison between Examples 2 and 3 and a comparison between Examples 4 and 5 that, even in a case where the peripheries of the through holes 31A in the core wire support boards 31 are not shaped into a curved line in shape, it is possible to improve the evenness of etching by increasing the reciprocation rate of the core wire holder 30.

REFERENCE SIGNS LIST

1: Etching device
11: First etching bath (etching bath)
12: Second etching bath (etching bath)
13: Cleaning bath
20, 60: Mounting cassette
22: Insertion section
30: Core wire holder
31: Core wire support board (core wire support member)
31A: Through holes (hole)
33, 73, 83: Connecting section
40: Crane (position change mechanism)
41: Arm
43: Lifting and lowering mechanism
62: Insertion section for short length
63: Insertion section for middle length
70: Short-length core wire holder
80: Middle-length core wire holder
C1: Silicon core wire
C2: Short-length silicon core wire (silicon core wire)
C3: Middle-length silicon core wire (silicon core wire)
L1: First etching solution (etching solution)
L2: Second etching solution (etching solution)
L3: Cleaning water
S1: Pass-through step
S3, S6: First immersing step
S4, S7: First position change step
S9: Second immersing step
S10: Second position change step

The invention claimed is:

1. A silicon core wire etching device comprising:
an etching bath for holding an etching solution in which a silicon core wire is to be immersed;
a plurality of core wire support members for supporting the silicon core wire, the plurality of core wire support members each having at least one hole, the at least one hole including a hole through which the silicon core wire is to pass; and
a position change mechanism for changing, while the silicon core wire is passed through the plurality of core wire support members and immersed in the etching solution, a relative position where the silicon core wire passes through in relation to the hole.

2. The silicon core wire etching device according to claim 1, wherein the position change mechanism is configured to reciprocate the plurality of core wire support members in an up-and-down direction.

3. The silicon core wire etching device according to claim 1, wherein the at least one hole is formed by a periphery shaped into a continuous, curved line.

4. The silicon core wire etching device according to claim 1, wherein
the silicon core wire passes through the hole formed in each of at least two core wire support members of the plurality of core wire support members, and
the at least two core wire support members are apart from each other by a distance that is adjustable according to a length of the silicon core wire.

5. The silicon core wire etching device according to claim 1, wherein the at least one hole includes a plurality of holes, and the plurality of core wire support members each have the plurality of holes.

6. The silicon core wire etching device according to claim 1, further comprising a cleaning bath for holding cleaning water in which the silicon core wire is to be immersed, wherein
the position change mechanism is configured to change, while the silicon core wire having been immersed in the etching solution is passed through the plurality of core wire support members and immersed in the cleaning water, a relative position where the silicon core wire passes through in relation to the hole.

7. A silicon core wire etching method comprising:
a pass-through step of passing a silicon core wire through a hole formed in each of a plurality of core wire support members for supporting the silicon core wire;
a first immersing step of immersing the silicon core wire supported by the plurality of core wire support members in an etching solution; and
a first position change step of changing a relative position where the silicon core wire passes through in relation to the hole.

8. The silicon core wire etching method according to claim 7, further comprising:
a second immersing step of immersing, after the first position change step, the silicon core wire supported by the plurality of core wire support members in cleaning water; and
a second position change step of changing, while the silicon core wire is immersed in the cleaning water, a relative position where the silicon core wire passes through in relation to the hole.

* * * * *